Sept. 18, 1934.   A. BIZZARRI   1,974,171
PNEUMATIC SUSPENSION MEANS
Original Filed Sept. 2, 1927   2 Sheets-Sheet 1
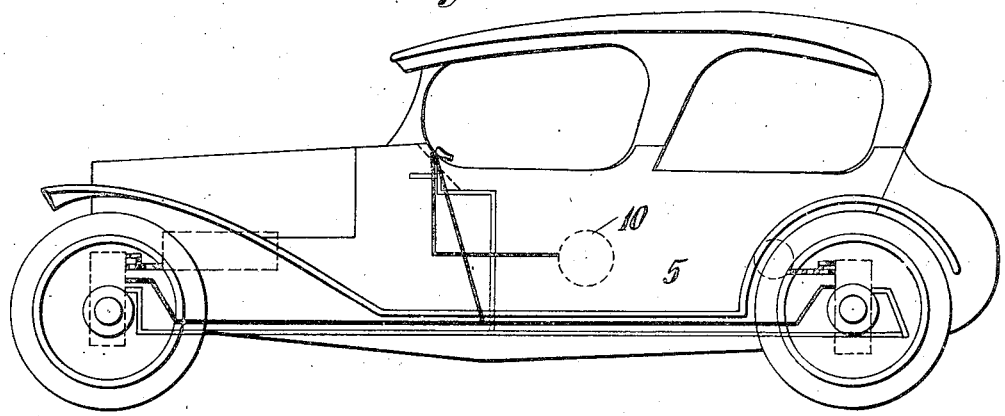
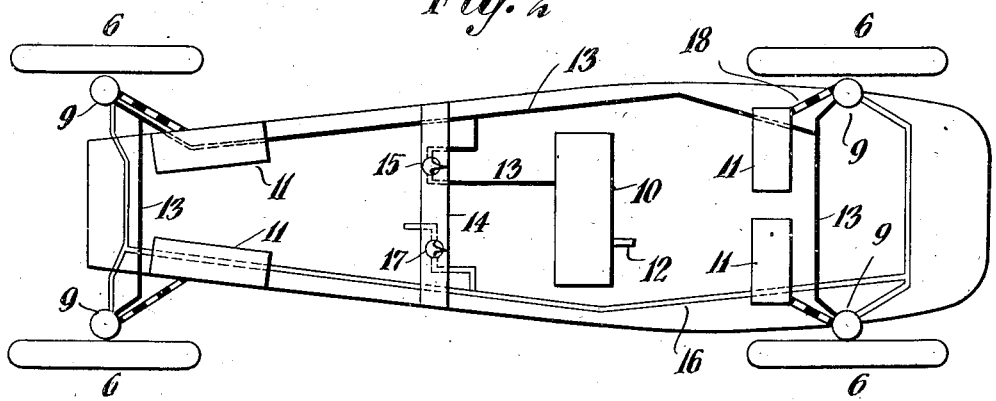

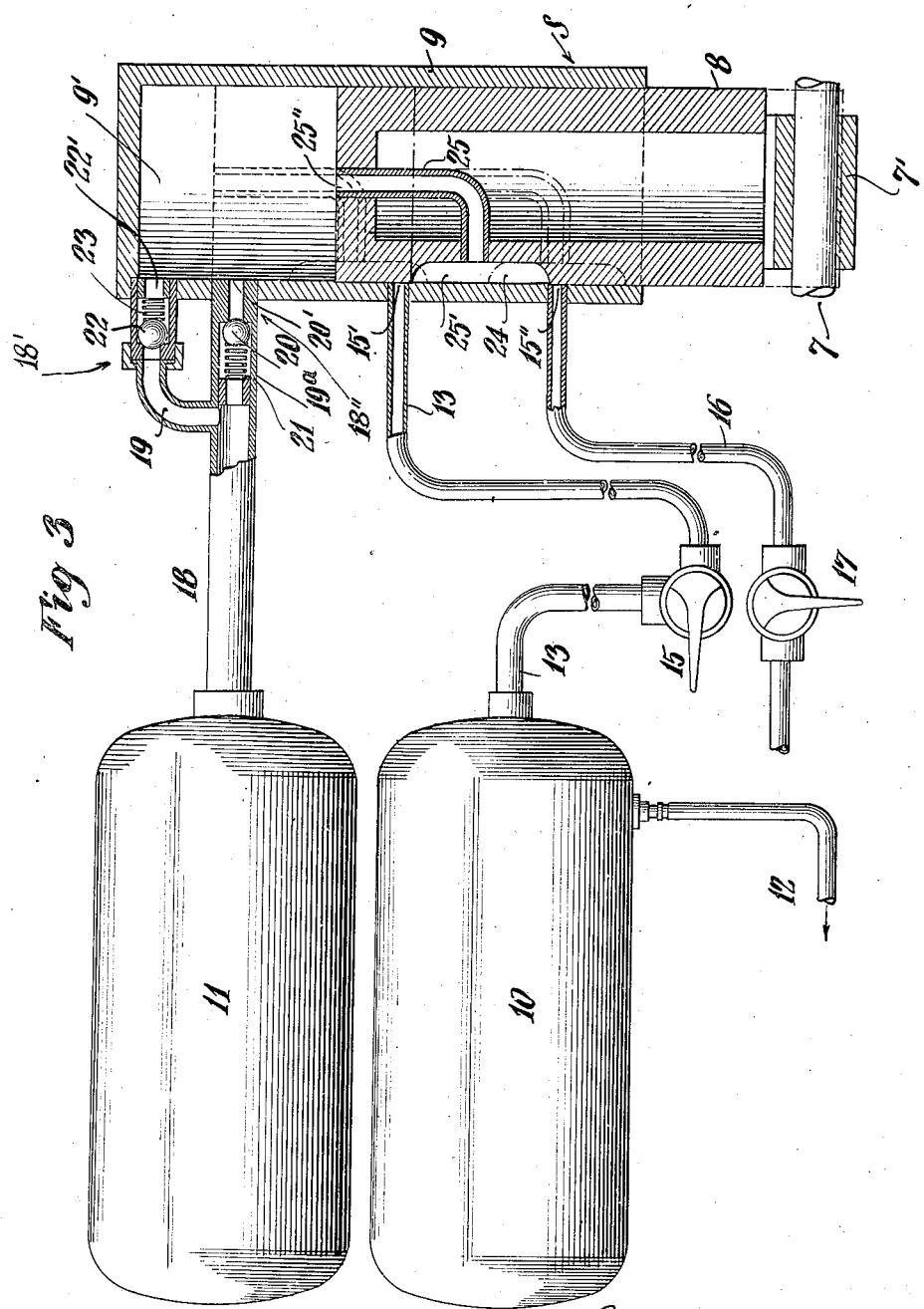

Patented Sept. 18, 1934

1,974,171

UNITED STATES PATENT OFFICE 1,974,171

PNEUMATIC SUSPENSION MEANS

Anthony Bizzarri, New York, N. Y.

Refiled for abandoned application Serial No. 217,226, September 2, 1927. This application December 7, 1933, Serial No. 701,397

10 Claims. (Cl. 280—124)

My present invention relates to vehicle frames or bodies, and more particularly to suspensions for the same, especially of the fluid or pneumatic type, and aims to devise vehicle bodies and frames, and suspensions therefor, of the general character specified which are simple in construction; which may be readily, conveniently and economically fabricated and assembled; which are adapted readily and efficiently to absorb road shocks; which are adapted to compensate for the irregular disposition of the load in the different parts of the vehicle or the like; which may be readily adjusted to compensate for different loads and different dispositions of some load carried by the vehicle or vehicle frame; and which possess other advantages in construction and in use which will in part be pointed out in detail hereinafter and will in part be obvious to those skilled in the art to which the present invention relates.

This application is a substitute application for my application covering the same device entitled "Pneumatic suspension means", Serial No. 217,226, filed September 2nd, 1927.

In the accompanying specification I shall describe, and in the annexed drawings, show, an illustrative embodiment of the present invention. It is, however, to be clearly understood that my invention is not limited to the specific embodiment thereof herein shown and described for purposes of illustration only.

Referring to the drawings, wherein I have illustrated the aforesaid illustrative embodiment of the present invention:—

Fig. 1 is a side elevation showing, more or less diagrammatically, the piping or connections of the suspension as applied to the four wheels of an automobile or like vehicle.

Fig. 2 is a top plan view, with certain of the parts removed to make the showing clearer, likewise showing the piping or connections for the suspension as applied to the four wheels of the automobile or like vehicle illustrated in side elevation of Fig. 1 of the drawing; and Fig. 3 is a view on an enlarged scale, partly in elevation, partly in section and partly broken away, showing one form of piping or connections for one of the suspensions and illustrating also the construction of one form of the suspension itself.

Referring now to the aforesaid illustrative embodiment of the present invention, and more particularly to the drawing illustrating the same, 5 indicates the body of the automobile or other vehicle to which the construction of the present invention may be applied. It may here be stated, however, that by the term "body" I mean to indicate also the frame or chassis of an automobile, the truck of a railway car, or the equivalent framework of any type of transportation or other vehicle provided with vehicle wheels of any desired construction.

The body 5 is intended and designed in the form herein illustrated and described for purposes of example merely not only to serve as a body in the usual sense for carrying passengers and goods, but also for connecting and securing in position the various parts constituting the suspension means and for carrying the various parts of the structure of the present invention. In other words, the so-called vehicle body 5 serves both as a chassis or frame and as a body in the ordinary and usual sense. It may here be stated that the suspensions of the present invention may, however, be employed in vehicles having the ordinary types of body construction with such changes as may be rendered necessary by reason of the features disclosed herein, all as will readily be apparent to those skilled in the art to which the present invention relates. 6 indicates the wheels of the vehicle, these being, as shown, four in number. However, any other desirable number of vehicle wheels may be employed. Moreover, all of the wheels 6 may be drive wheels or only part of the same may be, or, in fact, none of such wheels need be drive wheels, as would be the case, for example, with the ordinary railway truck.

Each of the wheels 6 may be so constructed and arranged with respect to its particular suspension and with respect to the vehicle frame or body as to be independently adjustable and so as to function independently of the other wheels. For this purpose, the wheels 6 are mounted on the independent axle sections 7. The exact construction of the wheels and of the independent mountings for the same as herein shown and described forms no part of the present invention, being more fully described and being fully claimed in my copending application Serial No. 217,225, filed of even date herewith and entitled "Independently mounted vehicle wheels". In such case a plurality of pressure tanks 10 may be used, one for each wheel and associated cylinder.

I provide suitable suspension means, preferably pneumatic suspension means, and preferably suspension means which for each wheel or group of wheels at one point of suspension is independent of the suspension means for the other wheels or groups of wheels. For this purpose I provide each wheel or group of wheels with a suspension piston, preferably rigidly associated with such wheel or group of wheels and preferably having the axle or axle section or sections passing through or otherwise properly mechanically associated with a portion of the suspension piston although the axle section need not pass through the suspension piston but may be rigidly associated with some other suitable supporting portion. For this purpose I may provide a plurality of axle sections 7 carried by sleeves 7' in which they are rigidly secured, the sleeves 7' being integral with or otherwise constituting a firm and rigid part of the lower portion of the piston 8 forming a part of the suspension for the particular wheel, the suspension being here generally designated by reference character S. It may here be stated, however, that by the term "rigid", as used in the specification and claims, I do not mean absolute rigidity, since the axle section 7 may, in certain cases, as in the case of drive wheels for an automobile, for example, be rotatable within the sleeve 7'. By this term I mean rather that the distance between the center of rotation of the wheel, that is, the distance between the axis of the axle portion 7 and any particular point of the piston, remains substantially constant under any and all operating conditions.

Cooperating with the various suspension pistons 8 are an equal number of associated suspension cylinders 9 which receive the respective suspension pistons 8, there being thus provided a pneumatic or air space 9' between the piston head and the inner face at the head of the cylinder. The cylinders 9 are rigidly secured to the vehicle body or frame 5 at the necessary points which constitute the points of suspension for the vehicle body or frame. This attachment may be effected in any suitable manner. The number of pistons 8 corresponds to the number of cylinders 9, which number may be varied as desired and as conditions require.

I provide a source of supply of air under pressure for charging the pneumatic space or cylinder chamber 9' to the desired degree of pneumatic pressure. For this purpose I may use pressure tank 10. I also provide means for bringing the source of supply of air under pressure in the pressure tank 10 into communication with the cylinder chamber 9', such means being preferably valve-controlled. I also provide means for exhausting or reducing the pressure in the cylinder chamber or space 9'.

For this purpose I may use various means, of which the means illustrated in the drawings are merely illustrative and more or less diagrammatic. For example, the pressure tank 10 may communicate by means of a pipe 12 with a pump or other suitable means for filling the tank 10 up to the desired pressure, such filling means not being deemed necessary to be shown here. By means of a plurality of pipes 13 controlled by the valve 15 the pressure tank 10 communicates with the cylinder 9. The valve 15 may either be manually operable and may be positioned on the dashboard of the vehicle, as indicated in Fig. 2 of the drawings, or such valve may be automatic and may comprise, for example, a reducing valve, such as the type of reducing valve shown, described and claimed in my copending application filed November 5, 1926, bearing Serial No. 146,305, and entitled "Reducing valve". The inlet pipe 13 communicates with the interior of the piston by means of the inlet port, 15'. 15" indicates the outlet port for the cylinder 9, this outlet port communicating by means of a pipe or connection 16 controlled by a valve 17 with the atmosphere. It may here be stated that the valve 17, like the valve 15, may be manually operable, or may be automatically operable, as by being in the form of a reducing valve, usually different, however, from the reducing valve which may be used for the valve 15 and which is shown in my copending application referred to above, although a similar type of valve may, under certain conditions, be employed.

I provide each suspension cylinder with what may be termed a pneumatic balancing tank. It may here be stated that I may provide one such pneumatic balancing tank for each cylinder or for each group of cylinders at one point of suspension of the vehicle. On the other hand, I may under certain conditions provide one such pneumatic balancing tank for each cylinder of a group of cylinders at one point of suspension. It is, however, important that there be at least one pneumatic balancing tank for each point of suspension and that the various pneumatic balancing tanks function substantially independently of each other. In this connection it may further be stated that each balancing tank should preferably be placed as close as possible to its associated cylinder or group of cylinders.

While various arrangements of this sort may be employed, all within the spirit of the present invention as defined in the appended claims, I may use the arrangement shown in the drawings by way of example merely and comprising a balancing tank 11 communicating, by means of the pipe or connection 18 and by way of the inlet and outlet check valves 18' and 18", respectively, with the cylinder chamber 9', the terms "inlet" and "outlet" being used with reference to the suspension cylinder 9. The inlet and outlet check valves 18' and 18" are connected on their balancing tank sides with the pipe or connection 18 by means of the connections 19 and 19a. The check valves 18' and 18", by means of which the cylinder chamber 9' is placed in communication, under certain conditions, with the balancing tank 11, may comprise, for example, the balls 22 and 20, held against the respective valve seats by means of the coil expansion springs 23 and 21. 22' indicates the port by which the inlet check valve 18' communicates with the cylinder chamber 9'. It will be noted that this inlet check valve 18' is located adjacent the uppermost portion of the cylinder chamber 9' and communicates with such cylinder chamber at a point above the point of communication of the port 20' of the outlet check valve 18" with the cylinder chamber 9'. It may here be stated that the location of the point of communication by way of the port 22', for example, of the cylinder chamber 9' with the inlet check valve 18' renders possible the provision of a high pressure pneumatic cushion above the head of the piston 8 under certain conditions of operation of the device and that the point of communication by way of the port 20', for example, of the cylinder chamber 9' with the outlet check valve 18" determines the point of normal maximum travel of the suspension piston 8 with respect to the corresponding suspension cylinder 9.

The piston 8 is provided with the lateral groove or slot 24 which is of elongated form and the size of which is exactly equal to the distance between the upper edge of the exhaust port 15" and the lower edge of the high pressure inlet port 15'.

It may here be stated that under normal operating conditions the groove or slot 24 will tend to maintain in average position between the ports 15' and 15" out of communication with both of such ports. By means of a flue 25 which communicates at the port 25' with the groove or slot 24 the groove 24 is brought into communication by means of the port 25" with the cylinder chamber 9'. Thus the cylinder chamber 9' may be brought into communication either with the pressure inlet port 15' or with the pressure outlet port 15".

This completes the description of the construction of the aforesaid illustrative embodiment of the present invention. The operation of said embodiment will likewise be clear from the foregoing description but may be briefly summarized as follows:

For illustration, let us assume that the wheel to which the piston is attached has gone into a very deep depression. The piston 8 will descend to its maximum low represented by the dotted line in Fig. 3 just below port 15'. As the pressure in the compression chamber 9' will decrease, because of the descent of the piston, air will flow from the equilibrium tank 11 through pipes 18 and 19, and port 22'. The high pressure tank 10 will be brought into direct communication with the compression chamber 9' through pipe 13 and port 15'. Meanwhile, of course, the exhaust 15" will be in communication with the compression chamber 9' through the cutaway portion 24 and the flue 25. Now, as the wheel comes out of the depression, the piston 8 will rise in its cylinder, and, of course, over-shoot its normal position, which is shown in full lines in Fig. 3. The pressure in the compression chamber 9' thus being increased, air will flow back into equilibrium tank 11, through port 20' and pipes 19a and 18. In this position the high compression tank 10 is brought into communication with the compression chamber 9' through the slot portion 24, and flue 25, the exhaust 15" now being sealed again. This will cause air under pressure to flow into the compression chamber 9' so that when the piston falls away again the cylinder will not follow it. The piston falls away again, of course, in a slighter degree, and thus brings the cutaway portion 24 into communication with the exhaust 15", thus letting the air flow out of the compression chamber 9' into the atmosphere. In this position the port 15' is sealed. There will now be a slight upward motion, again bringing the cutaway portion 24 into communication with the high pressure inlet 15' and so on in a vibratory motion, ever decreasing, like a pendulum, until the piston comes to rest in its normal position. It will be seen, of course, that as a result, the cylinder 9 will tend to remain in a substantially constant position, irrespective of the movements of the piston.

Now, let us assume that the wheel to which the piston is attached, goes into a slight depression. In this situation the piston will fall slightly, thus causing air to flow from the tank 11 into compression chamber 9'. The chamber 9' will be brought into communication with the exhaust through flue 25 and cutaway portion 24, while the port 15' is sealed. However, as the wheel comes out of the depression, the piston 8 will rise slightly but quickly, sealing the exhaust and putting the high pressure tank 10 into communication with the chamber 9', thus building up pressure in the chamber 9' so as to prevent the cylinder from following the motion of the piston as the latter falls away again, and forcing air to flow back into tank 11; the high pressure tank 10 will be brought into communication with the compression chamber 9' through pipe 16, port 15', cutaway portion 24 and flue 25; the exhaust will be sealed. The piston will then fall away slightly, sealing port 15' and putting the exhaust into communication with the compression chamber 9' through cutaway portion 24 and flue 25. Once again there will be a slight vibratory motion back and forth, alternately putting port 15' into communication with the cutaway portion 24 and port 15" into communication with cutaway portion 24, but never allowing both ports to be in communication at the same time. In the same manner cylinder 9 will remain in a substantially constant position irrespective of these vibratory motions of the piston 8.

Now, let us assume that the wheel to which the piston 8 is attached goes over a large bump. The piston will rise to its maximum point represented by the upper dotted line in Fig. 3. This will greatly compress the air in the compression chamber 9' and cause the air to flow into the equilibrium tank 11 through port 20, and pipe 18, instead of causing cylinder 9 to rise. The high pressure inlet 15' has been brought into communication with the compression chamber 9', through cutaway portion 24 and flue 25. Now, as the wheel goes over the bump and leaves it, the piston will gradually sink to its maximum low during part of which time the high pressure tank 10 has increased the pressure in compression chamber 9', thus preventing the cylinder from falling away with the piston 8. As the latter continues to drop, overshooting its normal, it will bring the exhaust 15" into communication with the compression chamber 9' through cutaway portion 24 and flue 25, thus allowing the air in compression chamber 9' to escape into the atmosphere; of course, at the same time sealing high pressure inlet 15'. The piston will immediately rise again bringing the high pressure inlet 15' into communication with compression chamber 9' through cutaway portion 24 and flue 25, and sealing the exhaust 15". This vibratory motion will then continue in ever decreasing motions like a pendulum until the piston is finally brought to rest in its normal position. Once again, it may be noted that in all these movements of the piston, the cylinder 9 has remained in a substantially constant position.

It may be noted that increasing the load is the equivalent of going over a bump, and decreasing the weight, the equivalent of going into a depression, and that the mode of operation will be substantially the same in each of these cases, as that to which it is equivalent.

This completes the description of the mode of operation of the aforesaid illustrative embodiment of the present invention. It will be noted that in operation the device is adapted to be adjusted to variations, whether increases or decreases, in the load, and to variations, whether depressions or elevations, in the road-bed. All this is accomplished in a simple manner which avoids unnecessary shocks to the vehicle and to the passengers and goods carried thereby. Other superiorities and advantages of the device of the present invention in operation and in use will readily occur to those skilled in the art to which the present invention relates.

What I claim as my invention is:

1. In a vehicle, a vehicle frame, vehicle wheels for said frame, and a pneumatic suspension interposed between said vehicle wheels and said vehicle frame, said pneumatic suspension comprising a suspension piston rigidly associated with each of said vehicle wheels, a plurality of cooperating suspension cylinders rigidly associated with said vehicle frame for receiving said suspension pistons, and means for regulating the pneumatic pressure in each of said cylinders in accordance with the load carried by the vehicle frame at each particular point of suspension, said regulating means comprising a source of supply of air under pressure communicating with each of said cylinders and means for establishing communication between said source of supply of air under pressure and each of said cylinders to increase the pressure therein and for reducing the pressure therein, in combination with a plurality of independent pneumatic balancing tanks each communicating with the suspension cylinder at one point of suspension of said vehicle frame, and means including a plurality of automatically operable inlet and outlet check valves for bringing one of said pneumatic balancing tanks into communication through said check valves with the associated suspension cylinder.

2. In a vehicle, a vehicle frame, vehicle wheels for said frame, and a pneumatic suspension interposed between said vehicle wheels and said vehicle frame, said pneumatic suspension comprising a suspension piston associated with each of said vehicle wheels, a plurality of cooperating suspension cylinders associated with said vehicle frame for receiving said suspension pistons, and means for regulating the pneumatic pressure in each of said cylinders in accordance with the load carried by the vehicle frame, said regulating means comprising a source of supply of air under pressure communicating with each of said cylinders and means for establishing communication between said source of supply of air under pressure and each of said cylinders to increase the pressure therein and for reducing the pressure therein, in combination with a plurality of independent pneumatic balancing tanks each communicating with the suspension cylinder or at one point of suspension of said vehicle frame, and means including a plurality of automatically operable inlet and outlet check valves for bringing one of said pneumatic balancing tanks into communication through said check valves with the associated suspension cylinder.

3. In a vehicle, a vehicle frame, vehicle wheels for said frame, and a pneumatic suspension interposed between said vehicle wheels and said vehicle frame, said pneumatic suspension comprising a suspension piston rigidly associated with each of said vehicle wheels, a plurality of cooperating suspension cylinders rigidly associated with said vehicle frame for receiving said suspension pistons, and means for regulating the pneumatic pressure in each of said cylinders in accordance with the load carried by the vehicle frame at each particular point of suspension, said regulating means comprising a source of supply of air under pressure communicating with each of said cylinders and means for establishing communication between said source of supply of air under pressure and each of said cylinders to increase the pressure therein and for reducing the pressure therein, in combination with a plurality of independent pneumatic balancing tanks each communicating with the suspension cylinder at one point of suspension of said vehicle frame, and means including a plurality of automatically operable inlet and outlet check valves for bringing one of said pneumatic balancing tanks into communication through said check valves with the associated suspension cylinder, each of said inlet check valves communicating with its respective suspension cylinder adjacent the uppermost portion thereof above the point of communication of said outlet check valve therewith, thereby to provide a high pressure pneumatic cushion above the corresponding suspension piston, and each of said outlet check valves communicating with its respective suspension cylinder at a point thereof corresponding to the normal maximum elevation of each of said suspension pistons in its corresponding suspension cylinder.

4. A combined stabilizing and shock-absorbing device, comprising a cylinder having a low pressure inlet adjacent the top of said cylinder, a low pressure outlet below the low pressure inlet, a high pressure inlet and an exhaust, a piston operable in said cylinder, and means whereby said cylinder is maintained in a substantially constant position irrespective of the movement of said piston.

5. A combined stabilizing and shock-absorbing device, comprising a cylinder having a low pressure inlet adjacent the top of said cylinder, a low pressure outlet below the low pressure inlet, a high pressure inlet below the low pressure outlet, and an exhaust below the high pressure inlet, a piston operable in said cylinder, and means whereby said cylinder is maintained in a substantially constant position irrespective of the movement of said piston.

6. A combined stabilizing and shock-absorbing device, comprising a cylinder having a low pressure inlet adjacent the top of said cylinder, a low pressure outlet below the low pressure inlet, a high pressure inlet below the low pressure outlet, and an exhaust below the high pressure inlet, a piston operable in said cylinder, and means whereby said cylinder is maintained in a substantially constant position irrespective of the movement of said piston.

7. A combined stabilizing and shock-absorbing device, comprising a cylinder, a compression chamber, a piston operable in said cylinder, said piston having a longitudinal cutout portion in the periphery thereof in communication with the compression chamber of said cylinder, and means whereby said cylinder is maintained in a substantially constant position irrespective of the movement of said piston.

8. A combined stabilizing and shock-absorbing device, comprising a cylinder, a compression chamber, a solid piston operable in said cylinder, said piston having a longitudinal cutout portion in the periphery thereof in communication with the compression chamber of said cylinder through a flue in said piston, and means whereby said cylinder is maintained in a substantially constant position irrespective of the movement of said piston.

9. A combined stabilizing and shock-absorbing device, comprising a cylinder having a compression chamber, an exhaust, a high pressure inlet and a low pressure inlet and outlet, a piston operable in said cylinder, said piston having a longitudinal cut-out portion in the periphery thereof, the size of which is equal to the distance between the adjacent edges of the high pressure inlet and the exhaust, in communication with the compression chamber of said cylinder, and means whereby said cylinder is maintained in a substantially constant position irrespective of the movement of said piston.

10. A combined stabilizing and shock-absorbing device, comprising a cylinder having a compression chamber, an exhaust, a high pressure inlet and a low pressure inlet and outlet, a piston operable in said cylinder, said piston having a longitudinal cut-out portion in the periphery thereof the size of which is equal to the distance between the adjacent edges of the high pressure outlet and the exhaust, in communication with the compression chamber of said cylinder through a flue in said piston, and means whereby said cylinder is maintained in a substantially constant position irrespective of the movement of said piston.

ANTHONY BIZZARRI.